(12) United States Patent
Wu et al.

(10) Patent No.: US 10,935,638 B2
(45) Date of Patent: Mar. 2, 2021

(54) LASER RADAR SYSTEM

(71) Applicant: Hesai Photonics Technology Co., Ltd., Shanghai (CN)

(72) Inventors: Shixiang Wu, Shanghai (CN); Shaoqing Xiang, Shanghai (CN)

(73) Assignee: Hesai Photonics Technology Co., Ltd., Shanghai (CN)

( * ) Notice: Subject to any disclaimer, the term of this patent is extended or adjusted under 35 U.S.C. 154(b) by 0 days.

(21) Appl. No.: 16/809,481

(22) Filed: Mar. 4, 2020

(65) Prior Publication Data
US 2020/0292671 A1 Sep. 17, 2020

(30) Foreign Application Priority Data

Mar. 11, 2019 (CN) .......................... 201910183246.X

(51) Int. Cl.
*G01S 7/481* (2006.01)
*G02B 17/08* (2006.01)

(52) U.S. Cl.
CPC .......... *G01S 7/4816* (2013.01); *G01S 7/4812* (2013.01); *G02B 17/0856* (2013.01)

(58) Field of Classification Search
CPC .. G01S 7/4816; G01S 7/4812; G02B 17/0856
USPC ....................................................... 356/4.01
See application file for complete search history.

(56) References Cited

U.S. PATENT DOCUMENTS

2019/0242982 A1  8/2019  Wang et al.

FOREIGN PATENT DOCUMENTS

| CN | 101963665 A | 2/2011 |
|---|---|---|
| CN | 101975942 A | 2/2011 |
| CN | 106324582 A | 1/2017 |
| CN | 107688171 A | 2/2018 |

(Continued)

OTHER PUBLICATIONS

First Search dated May 21, 2020, issued in related Chinese Patent Application No. 201910183246.X (2 pages).

(Continued)

*Primary Examiner* — Daniel L Murphy
(74) *Attorney, Agent, or Firm* — Sheppard Mullin Richter & Hampton LLP

(57) ABSTRACT

The present invention provides a laser radar system, including: a transmission module, disposed in a transmission optical path, and adapted to transmit a laser beam; a rotating shaft; and a receiving module, disposed in a receiving optical path, and adapted to receive an echo signal of the laser beam, the receiving module including a receiving lens group and a detection assembly. The transmission module and the receiving module are respectively disposed on a first side and a second side of the rotating shaft and are adapted to rotate around the rotating shaft. The receiving optical path includes a first receiving optical path and a second receiving optical path. In the first receiving optical path, the echo signal of the laser beam is transmitted from the first side of the rotating shaft to the second side of the rotating shaft and is received by the receiving lens group. In the second receiving optical path, the echo signal of the laser beam is received by the detection assembly through convergent refraction and back-and-forth reflection of the receiving lens group. A portion, located on the first side of the rotating shaft, of the first receiving optical path is disposed around the transmission optical path.

14 Claims, 2 Drawing Sheets

(56) References Cited

FOREIGN PATENT DOCUMENTS

| CN | 207352168 U | 5/2018 |
| CN | 208569044 A | 3/2019 |
| DE | 3227980 A | 5/1983 |
| GB | 2219167 A | 11/1989 |

OTHER PUBLICATIONS

First Office Action dated Jun. 1, 2020, issued in related Chinese Patent Application No. 201910183246.X, with English machine translation (12 pages).

LASER RADAR SYSTEM

The present application claims priority to Chinese Patent Application No. 201910183246.X, filed with the China National Intellectual Property Administration on Mar. 11, 2019, which is incorporated herein by reference in its entirety.

BACKGROUND

Technical Field

The present invention relates to the field of laser detection technologies, and in particular, to a laser radar system.

Related Art

A laser radar is an advanced detection method combining laser technologies with photoelectric detection technologies. Laser radars have advantages such as high resolution, good concealment, high capability of anti-active jamming, desirable performance of low altitude detection, small volume, and light weight, and are widely applied to the fields such as autonomous driving, traffic communications, unmanned aerial vehicles, intelligent robots, energy safety inspection, and resource exploration.

Laser radars may include a uniaxial system and a nonuniaxial (such as biaxial) system according to whether transmitting and receiving optical axes coincide. A structure in which a transmitting end is adjacent to a receiving end is used in most existing biaxial solutions, resulting in a relatively large volume, non-uniform weight distribution, and relatively large weight of the overall machine after a counterweight is provided. In addition, it is difficult to pair a receiving end and a transmitting end, resulting in instability and high susceptibility to various factors such as temperature and vibration, causing relatively large detection errors. A compact structure is achieved in a uniaxial solution. However, internal stray light in the uniaxial solution may adversely affect detection or even cause a dead zone.

How to further optimize the structural design of a laser radar to improve the comprehensive performance of the laser radar is an urgent problem.

SUMMARY

To optimize the structural design of a laser radar to improve the comprehensive performance of the laser radar, embodiments of the present invention provide a laser radar system.

In some embodiments, the laser radar system may include: a transmission module, disposed in a transmission optical path, and adapted to transmit a laser beam; a rotating shaft; and a receiving module, disposed in a receiving optical path, and adapted to receive an echo signal of the laser beam, the receiving module including a receiving lens group and a detection assembly, where the transmission module and the receiving module are respectively disposed on a first side and a second side of the rotating shaft and are adapted to rotate around the rotating shaft; and the receiving optical path includes a first receiving optical path and a second receiving optical path, in the first receiving optical path, the echo signal of the laser beam is transmitted from the first side of the rotating shaft to the second side of the rotating shaft and is received by the receiving lens group, in the second receiving optical path, the echo signal of the laser beam is received by the detection assembly through convergent refraction and back-and-forth reflection of the receiving lens group, and a portion, located on the first side of the rotating shaft, of the first receiving optical path is disposed around the transmission optical path.

Optionally, the receiving lens group defines a catadioptric zone, the catadioptric zone includes a first boundary and a second boundary that are opposite, and the receiving lens group is adapted to enable the echo signal of the laser beam to be convergently refracted and reflected back and forth between the first boundary and the second boundary of the catadioptric zone.

Optionally, the detection assembly is disposed between the first boundary and the second boundary of the catadioptric zone.

Optionally, the receiving lens group includes a first optical component and a second optical component that are disposed opposite and a third optical component that is disposed between the first optical component and the second optical component; the first optical component includes a refracting portion and a reflecting portion, the refracting portion is adapted to receive and convergently refract the echo signal of the laser beam, and the reflecting portion is adapted to reflect the echo signal of the laser beam convergently refracted by the refracting portion to the second optical component; the second optical component is adapted to reflect the echo signal of the laser beam reflected by the reflecting portion of the first optical component to the third optical component; the third optical component is adapted to converge the echo signal of the laser beam reflected by the second optical component to the detection assembly, where the position of the reflecting portion of the first optical component is the first boundary of the catadioptric zone, and the position of the second optical component is the second boundary of the catadioptric zone.

Optionally, the first optical component, the second optical component, and the third optical component are disposed on the second side of the rotating shaft, the second optical component is disposed close to the rotating shaft, the third optical component is disposed between the first optical component and the second optical component at a position closer to the first optical component than to the second optical component, and the detection assembly is disposed between the third optical component and the first optical component.

Optionally, the refracting portion of the first optical component includes a converging lens, the reflecting portion of the first optical component includes a reflective film, and one surface of the converging lens is coated with the reflective film.

Optionally, the refracting portion of the first optical component includes a converging lens, and the reflecting portion of the first optical component includes a reflector.

Optionally, the second optical component includes a planar reflector, and/or the third optical component includes a converging lens.

Optionally, the third optical component includes a lens of a long focal length.

Optionally, the size of the first optical component is greater than the size of the second optical component, and the size of the second optical component is greater than the size of the third optical component.

Optionally, an optical axis of the transmission optical path is collinear with an optical axis of the receiving optical path, and a size of the transmission module in a direction perpendicular to the optical axis of the transmission optical path is less than a size of the receiving module in a direction perpendicular to the optical axis of the receiving optical path.

Optionally, the laser radar system further includes: a first light shield, disposed around the transmission module and extending in a direction parallel to the optical axis of the transmission optical path, where one end of the first light shield in the direction parallel to the optical axis of the transmission optical path is disposed close to the rotating shaft, and the other end of the first light shield in the direction parallel to the optical axis of the transmission optical path is provided with a window adapted to transmit the laser beam.

Optionally, the laser radar system further includes: a second light shield, disposed around the first receiving optical path and extending in a direction parallel to the optical axis of the receiving optical path, where one end of the second light shield in the direction parallel to the optical axis of the receiving optical path and the receiving lens group are disposed opposite to each other, and the other end of the second light shield in the direction parallel to the optical axis of the receiving optical path is provided with a window adapted to receive the echo signal of the laser beam, where an optical channel is formed between the first light shield and the second light shield, and the optical channel is adapted for the echo signal of the laser beam to pass through.

Optionally, the transmission module includes: a laser source, adapted to transmit the laser beam; and a transmission lens group, adapted to transmit or adjust the laser beam transmitted by the laser source, where a size of the transmission optical path in a direction perpendicular to an optical axis of the transmission optical path is determined by a size of the transmission lens group.

Optionally, the transmission lens group includes a lens of a short focal length.

Compared with the prior art, the technical solutions of the embodiments of the present invention have the following beneficial effects.

The transmission module and the receiving module of the laser radar system in the embodiments of the present invention are separately disposed on two sides of the rotating shaft, the transmission module and the receiving module use different lens groups, and a shielding area of the rotating shaft is used to arrange a transmission optical path to implement separation between reception and transmission, thereby reducing internal stray light. The receiving module uses an optical path design with a plurality of times of refraction and reflection, and various optical components can be disposed in a limited space, so that space is appropriately used, thereby reducing the volume of the entire laser radar system. The receiving module refracts and reflects the echo signal of the laser beam a plurality of times, and at the same time converges the echo signal of the laser beam a plurality of times, thereby generating a long focal length. Because the first receiving optical path is disposed around the transmission optical path, and the receiving module is then disposed in the second receiving optical path, a light shield can be naturally formed, thereby reducing ambient light interference and improving a signal-to-noise ratio.

Further, the receiving optical path and transmission optical path of the laser radar system are designed to be approximately uniaxial, and the transmission module and the receiving module are uniformly distributed around the rotating shaft, thereby avoiding the problem that the top part is heavier than the bottom part of a conventional non-uniaxial optical path and reducing of the total weight of the laser radar system.

Further, the internal structural design of the laser radar system is also suitable for the placement of a plurality of light shields. The first light shield may be disposed around the transmission optical path. The second light shield may be disposed around the first receiving optical path. The first light shield and the second light shield can both absorb ambient light more adequately to increase a signal-to-noise ratio and form the optical channel for the echo signal of the laser beam to pass through.

DETAILED DESCRIPTION

To make the objectives, features, and beneficial effects of the present invention more apparent and comprehensible, specific embodiments of the present invention are described in detail below with reference to the accompanying drawings. The embodiments in this specification are all described in a progressive manner. Descriptions of each embodiment focus on differences from other embodiments, and for same or similar parts among respective embodiments, reference may be made to each other.

Figure 1:
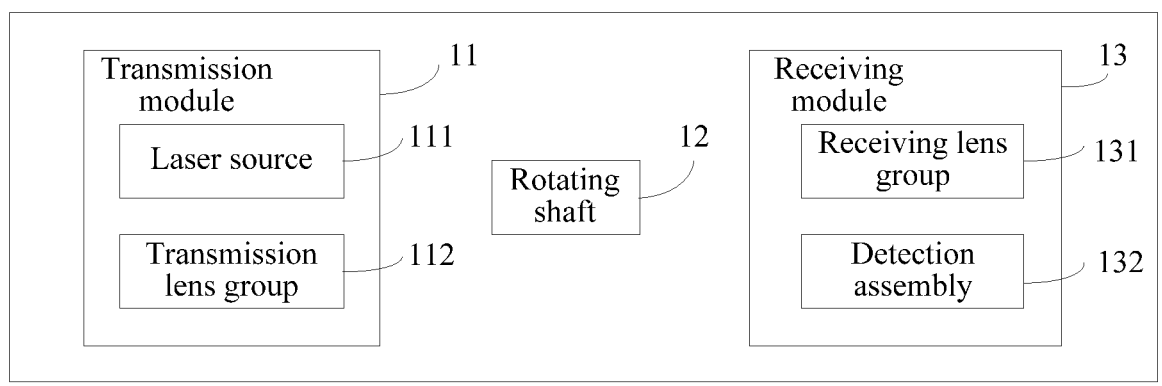
FIG. 1 is a structural block diagram of a laser radar system 10 according to an embodiment of the present invention.
Figure 2:
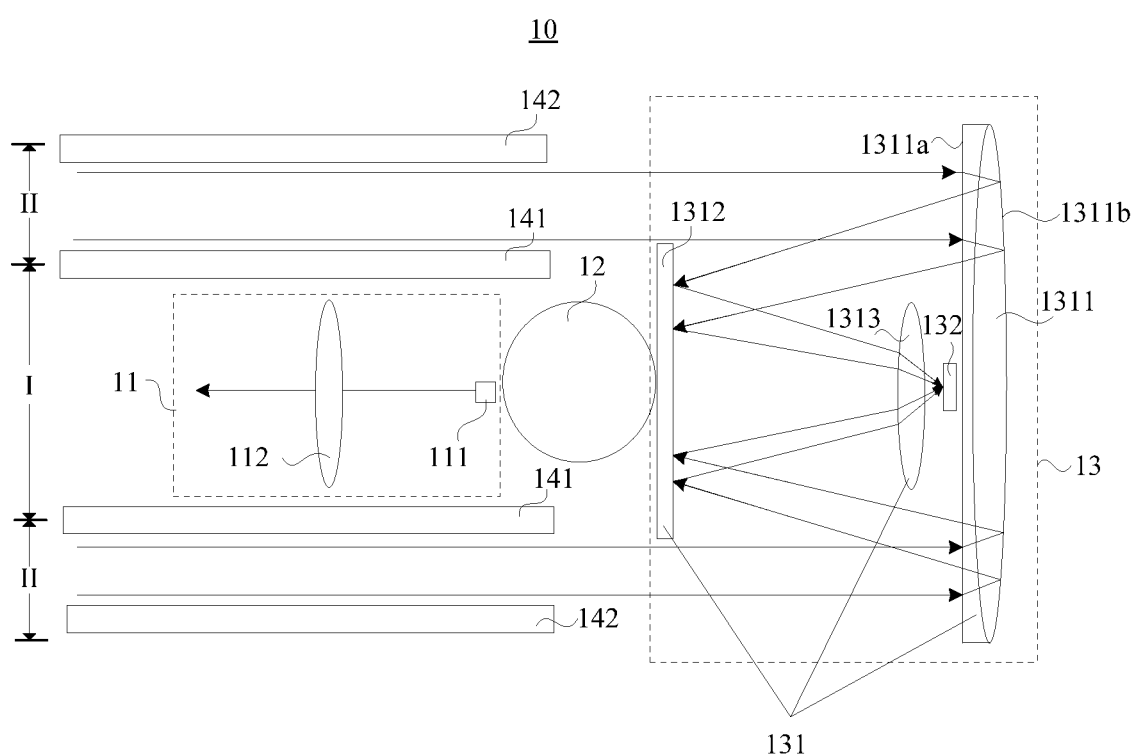
FIG. 2 is a schematic structural sectional view of a laser radar system 10 according to an embodiment of the present invention.

FIG. 1 is a structural block diagram of a laser radar system 10 according to an embodiment of the present invention. FIG. 2 is a schematic structural sectional view of a laser radar system 10 according to an embodiment of the present invention.

In some embodiments, the laser radar system 10 may include a transmission module 11, a rotating shaft 12, and a receiving module 13. The transmission module 11 and the receiving module 13 are respectively disposed on a first side and a second side of the rotating shaft 12 and are adapted to rotate around the rotating shaft 12. The transmission module 11 is disposed in a transmission optical path and is adapted to transmit a laser beam. The receiving module 13 is disposed in a receiving optical path, and is adapted to receive an echo signal of the laser beam. The echo signal of the laser beam is formed by the reflection of the laser beam transmitted by the transmission module 11 by an obstacle in a three-dimensional space.

In some embodiments, the transmission module 11 may include a laser source 111 and a transmission lens group 112. The laser source 111 is adapted to transmit the laser beam. The transmission lens group 112 is adapted to transmit or adjust the laser beam transmitted by the laser source 111. As shown in FIG. 2, a size of the transmission optical path in a direction perpendicular to an optical axis of the transmission optical path may be determined by a size of the transmission lens group 112. For example, the transmission lens group 112 may include a lens group. The size of the transmission optical path in the direction perpendicular to the optical axis of the transmission optical path may be determined by the diameter of the lens group.

In some embodiments, the laser source 111 may include only one laser or the laser source 111 may be a laser array including a plurality of lasers. The transmission lens group 112 may include a collimating lens. The collimating lens is adapted to collimate the laser beam transmitted by the laser. Specifically, the collimating lens may include a lens of a short focal length, to adapt to the size of a transmission chamber inside the laser radar system 10.

In some embodiments, the receiving module 13 may include a receiving lens group 131 and a detection assembly 132. The receiving optical path may include a first receiving optical path and a second receiving optical path. In the first receiving optical path, the echo signal of the laser beam is transmitted from the first side of the rotating shaft 12 to the second side of the rotating shaft 12 and is received by the receiving lens group 131. In the second receiving optical path, the echo signal of the laser beam is received by the detection assembly 132 through a plurality of times of convergent refraction and a plurality of times of back-and-forth reflection of the receiving lens group 131. The first receiving optical path includes a portion located on the first side of the rotating shaft 12 and a portion located on the second side of the rotating shaft 12. A portion, located on the first side (that is, a side on which the laser source 111 and the transmission lens group 112 are located) of the rotating shaft 12, of the first receiving optical path is disposed around the transmission optical path.

In some embodiments, the receiving lens group 131 may include a plurality of optical components. The plurality of optical components are disposed sequentially along the receiving optical path. One optical component located most upstream of the receiving optical path is adapted to receive the echo signal of the laser beam transmitted from the first side of the rotating shaft 12, and is adapted to transmit the echo signal of the laser beam to other optical components located downstream of the optical path thereof. The one optical component located most upstream of the receiving optical path may be considered as a demarcation point of the first receiving optical path and the second receiving optical path, and the other optical components are all disposed in the second receiving optical path.

In some embodiments, the receiving lens group 131 defines a catadioptric zone. The catadioptric zone includes a first boundary and a second boundary that are opposite. The receiving lens group 131 is adapted to enable the echo signal of the laser beam to be convergently refracted a plurality of times and reflected back and forth a plurality of times between the first boundary and the second boundary of the catadioptric zone. The detection assembly 132 is disposed between the first boundary and the second boundary of the catadioptric zone.

In some embodiments, the receiving lens group 131 may include a first optical component 1311 and a second optical component 1312 that are disposed opposite and a third optical component 1313 that is disposed between the first optical component 1311 and the second optical component 1312. The first optical component 1311 may include a refracting portion and a reflecting portion. The refracting portion is adapted to receive and convergently refract the echo signal of the laser beam transmitted from the first side of the rotating shaft 12, and the reflecting portion is adapted to reflect the echo signal of the laser beam convergently refracted by the refracting portion to the second optical component 1312. The second optical component 1312 is adapted to reflect the echo signal of the laser beam reflected by the reflecting portion of the first optical component 1311 to the third optical component 1313. The third optical component 1313 is adapted to converge the echo signal of the laser beam reflected by the second optical component 1312 to the detection assembly 132.

An area between the first optical component 1311 and the second optical component 1312 is the catadioptric zone. The position of the reflecting portion of the first optical component 1311 may be considered as the first boundary of the catadioptric zone, and the position of the second optical component 1312 may be considered as the second boundary of the catadioptric zone.

In some embodiments, the first optical component 1311, the second optical component 1312, and the third optical component 1313 are all disposed on the second side of the rotating shaft 12. The second optical component 1312 is disposed close to the rotating shaft 12. The first optical component 1311 is disposed away from the rotating shaft 12 relative to the second optical component 1312. The third optical component 1313 is disposed between the first optical component 1311 and the second optical component 1312 at a position closer to the first optical component 1311 than to the second optical component 1312. The detection assembly 132 is disposed between the third optical component 1313 and the first optical component 1311.

In some embodiments, the refracting portion of the first optical component 1311 may include a converging lens. The reflecting portion of the first optical component 1311 may include a reflective film. The converging lens includes a first surface 1311a and a second surface 1311b that are opposite. The echo signal of the laser beam is converged on the first surface 1311a and the second surface 1311b by refraction of the converging lens. The second surface 1311b of the converging lens is coated with the reflective film. The echo signal of the converged laser beam is reflected to the second optical component 1312 by the reflective film.

In some other embodiments, the refracting portion of the first optical component 1311 may include a converging lens, and the reflecting portion of the first optical component 1311 may include a reflector. The converging lens and the reflector may constitute an optical lens group or may be disposed separately.

In some other embodiments, the first optical component 1311 may be alternatively a reflecting element such as a parabolic reflector. The echo signal of the laser beam is reflected and converged by the first optical component 1311, and is transmitted to the second optical component 1312.

In some embodiments, the second optical component 1312 may include a planar reflector, and/or the third optical component 1313 may include a converging lens. Specifically, the first optical component 1311 may include a lens of a long focal length. Because the receiving lens group 131 enables the echo signal of the laser beam to be convergently refracted a plurality of times and reflected back and forth a plurality of times between the first boundary and the second boundary of the catadioptric zone, the receiving lens group 131 has a long focal length.

In some embodiments, the first optical component 1311, the second optical component 1312, and the third optical component 1313 may be uniaxially disposed. A size of the first optical component 1311 in a direction perpendicular to an optical axis of the receiving optical path is greater than a size of the second optical component 1312 in a direction perpendicular to the optical axis of the receiving optical path, so that an edge area of the first optical component 1311 in the direction perpendicular to the optical axis of the receiving optical path can be used to receive the echo signal of the laser beam transmitted from the first side of the rotating shaft 12, and the echo signal of the laser beam is prevented from being blocked by the second optical component 1312. Moreover, the size of the second optical component 1312 in the direction perpendicular to the optical axis of the receiving optical path is greater than the size of the third optical component 1313 in the direction perpendicular to the optical axis of the receiving optical path, so that the second optical component 1312 can receive the echo signal of the laser beam converged and reflected by the first optical component 1311, and the echo signal of the laser beam is prevented from being completely blocked by the third optical component 1313. In addition, because the third optical component 1313 is disposed closer to the first optical component 1311 than to the second optical component 1312, a degree to which the echo signal of the laser beam converged and reflected by the first optical component 1311 is blocked by the third optical component 1313 can further be reduced, so that the second optical component 1312 receives the echo signal of the laser beam as much as possible.

In some embodiments, the first optical component 1311 may be a lens having a relatively large diameter or may be a combination of a plurality of lenses having a relatively small diameter.

In some embodiments, the optical axis of the transmission optical path is collinear with the optical axis of the receiving optical path. That is, the receiving optical path and the transmission optical path of the laser radar system 10 are designed to be approximately uniaxial, and a size of the transmission module 11 in a direction perpendicular to the optical axis of the laser radar system 10 is less than a size of the receiving module 13 in a direction perpendicular to the optical axis of the laser radar system 10, so that an intermediate area (that is, an area I in FIG. 2) of the first side of the rotating shaft 12 can be used to transmit the laser beam, and an edge area (that is, an area II in FIG. 2) of the first side of the rotating shaft 12 can be used to receive the echo signal of the laser beam.

In some embodiments, the laser radar system 10 may further include a first light shield 141. The first light shield 141 is disposed around the transmission module 11 and extends in a direction parallel to the optical axis of the transmission optical path. Specifically, the first light shield 141 may be disposed around a boundary of the transmission optical path in the direction perpendicular to the optical axis of the transmission optical path. As described above, a size of the transmission optical path in a direction perpendicular to the optical axis of the transmission optical path may be determined by a size of the transmission lens group 112. When the transmission lens group 112 includes a lens group, the first light shield 141 may be disposed immediately adjacent to the periphery of the transmission optical path 112. One end of the first light shield 141 in the direction parallel to the optical axis of the transmission optical path may be disposed close to the rotating shaft 12, and the other end of the first light shield 141 in the direction parallel to the optical axis of the transmission optical path may be provided with a window (not shown) adapted to transmit the laser beam.

In some embodiments, the laser radar system may further include a second light shield 142. The second light shield 142 is disposed around the first receiving optical path and extends in a direction parallel to the optical axis of the receiving optical path. One end of the second light shield 142 in the direction parallel to the optical axis of the receiving optical path and the receiving lens group are disposed opposite, and the other end of the second light shield 142 in the direction parallel to the optical axis of the receiving optical path is provided with a window (not shown) adapted to receive the echo signal of the laser beam. The echo signal of the laser beam is formed by an obstacle in a three-dimensional space reflecting the laser beam transmitted by the transmission module 11.

Specifically, the one end of the second light shield 142 in the direction parallel to the optical axis of the receiving optical path may be disposed close to the rotating shaft 12 (as shown in FIG. 2) or may be disposed close to the first optical component 1311 (not shown).

In some embodiments, an optical channel is formed between the first light shield 141 and the second light shield 142, and the optical channel is adapted for the echo signal of the laser beam to pass through.

In some embodiments, the first light shield 141 and the second light shield 142 may all have a tubular structure, and the second light shield 142 may be sleeved on the periphery of the first light shield 141. Specifically, the first light shield 141 and the second light shield 142 may be circular tubes, oval tubes, square tubes, polygonal tubes or the like.

In some embodiments, the first side of the rotating shaft 12 may be completely used for receiving the echo signal of the laser beam. That is, there is no distinctive boundary between the transmission optical path and the receiving optical path. The optical channel between the first light shield 141 and the second light shield 142 may be used for receiving the echo signal, and a transmitting area in which the transmission module 11 is located can also be used for receiving the echo signal without affecting the transmission of the laser beam.

In some embodiments, the detection assembly 132 may include a detector array. Each detector includes a photoelectric sensor. The photoelectric sensor is adapted to convert an optical signal received by the photoelectric sensor into an electrical signal. Specifically, the photoelectric sensor may be a PIN photoelectric sensor, an avalanche photodiode (APD), or a Geiger-mode avalanche photodiode (GM-APD) or the like.

In some embodiments, the laser radar system 10 may further include a rotor (not shown) and a stator (not shown). A transmission chamber that is defined by the first light shield 141 and the rotating shaft 12 and a receiving chamber that is defined by the first light shield 141, the second light shield 142, and the rotating shaft 12 are provided inside the rotor. The transmission module 11 is disposed in the transmission cavity, and the receiving module 13 is disposed in the receiving chamber.

In some embodiments, the laser radar system 10 may further include a processing module, adapted to process the electrical signal detected by the detection assembly 132 and obtain information about the obstacle detected by the laser radar system 10 by a program such as a computing program. The information about the obstacle may be a position, a shape, a speed or the like.

In summary, the transmission module and the receiving module of the laser radar system in the embodiments of the present invention are separately disposed on two sides of the rotating shaft, the transmission module and the receiving module use different lens groups, and a shielding area of the rotating shaft is used to arrange a transmission optical path to implement separation between reception and transmission, thereby reducing internal stray light. The receiving module uses an optical path design with a plurality of times of refraction and reflection, and various optical components can be disposed in a limited space, so that space is appropriately used, thereby reducing the volume of the entire laser radar system. The receiving module refracts and reflects the echo signal of the laser beam a plurality of times, and at the same time converges the echo signal of the laser beam a plurality of times, thereby generating a long focal length. Because the first receiving optical path is disposed around the transmission optical path, and the receiving module is then disposed in the second receiving optical path, a light shield can be naturally formed, thereby reducing ambient light interference and improving a signal-to-noise ratio.

Further, the receiving optical path and transmission optical path of the laser radar system are designed to be approximately uniaxial, and the transmission module and the receiving module are uniformly distributed around the rotating shaft, thereby avoiding the problem that the top part is heavier than the bottom part of a conventional non-uniaxial optical path and reducing of the total weight of the laser radar system.

Further, the internal structural design of the laser radar system is also suitable for the placement of a plurality of light shields. The first light shield may be disposed around the transmission optical path. The second light shield may be disposed around the first receiving optical path. The first light shield and the second light shield can both absorb ambient light more adequately to increase a signal-to-noise ratio and form the optical channel for the echo signal of the laser beam to pass through.

Although the present invention is disclosed as above, the present invention is not limited thereto. Any person skilled in the art can make various alterations and modifications without departing from the spirit and scope of the present invention. Therefore, the protective scope of the present invention should be understood according to the scope defined by the claims.

What is claimed is:

1. A laser radar system, comprising:
   a transmission module, disposed in a transmission optical path, and adapted to transmit a laser beam;
   a rotating shaft; and
   a receiving module, disposed in a receiving optical path, and adapted to receive an echo signal of the laser beam, the receiving module comprising a receiving lens group and a detection assembly, wherein
   the transmission module and the receiving module are respectively disposed on a first side and a second side of the rotating shaft and are adapted to rotate around the rotating shaft; and
   the receiving optical path comprises a first receiving optical path and a second receiving optical path, wherein in the first receiving optical path, the echo signal of the laser beam is transmitted from the first side of the rotating shaft to the second side of the rotating shaft and is received by the receiving lens group, in the second receiving optical path, the echo signal of the laser beam is received by the detection assembly through convergence and reflection of the receiving lens group, and a portion, located on the first side of the rotating shaft, of the first receiving optical path is disposed around the transmission optical path.

2. The laser radar system according to claim 1, wherein the receiving lens group defines a catadioptric zone, the catadioptric zone comprises a first boundary and a second boundary that are opposite, and the receiving lens group is adapted to enable the echo signal of the laser beam to be converged and reflected between the first boundary and the second boundary of the catadioptric zone.

3. The laser radar system according to claim 2, wherein the detection assembly is disposed between the first boundary and the second boundary of the catadioptric zone.

4. The laser radar system according to claim 2, wherein the receiving lens group comprises a first optical component and a second optical component that are disposed opposite and a third optical component that is disposed between the first optical component and the second optical component, wherein the first optical component comprises a refracting portion and a reflecting portion, the refracting portion is adapted to receive and convergently refract the echo signal of the laser beam, and the reflecting portion is adapted to reflect the echo signal of the laser beam convergently refracted by the refracting portion to the second optical component;
the second optical component is adapted to reflect the echo signal of the laser beam reflected by the reflecting portion of the first optical component to the third optical component; and
the third optical component is adapted to converge the echo signal of the laser beam reflected by the second optical component to the detection assembly, wherein
the position of the reflecting portion of the first optical component is the first boundary of the catadioptric zone, and the position of the second optical component is the second boundary of the catadioptric zone.

5. The laser radar system according to claim 4, wherein the first optical component, the second optical component, and the third optical component are disposed on the second side of the rotating shaft, the second optical component is disposed close to the rotating shaft, the third optical component is disposed between the first optical component and the second optical component and at a position closer to the first optical component than to the second optical component, and the detection assembly is disposed between the third optical component and the first optical component.

6. The laser radar system according to claim 4, wherein the refracting portion of the first optical component comprises a converging lens, and the reflecting portion of the first optical component comprises a reflective film, and one surface of the converging lens is coated with the reflective film.

7. The laser radar system according to claim 4, wherein the refracting portion of the first optical component comprises a converging lens, and the reflecting portion of the first optical component comprises a reflector.

8. The laser radar system according to claim 4, wherein the second optical component comprises a planar reflector, and/or the third optical component comprises a converging lens.

9. The laser radar system according to claim 8, wherein the converging lens has a focal length shorter than a focal length of a lens of the first optical component.

10. The laser radar system according to claim 4, wherein a size of the first optical component is greater than a size of the second optical component, and the size of the second optical component is greater than a size of the third optical component.

11. The laser radar system according to claim 1, wherein an optical axis of the transmission optical path is collinear with an optical axis of the receiving optical path, and a size of the transmission module in a direction perpendicular to the optical axis of the transmission optical path is less than a size of the receiving module in a direction perpendicular to the optical axis of the receiving optical path.

12. The laser radar system according to claim 11, further comprising: a first light shield, disposed around the transmission module and extending in a direction parallel to the optical axis of the transmission optical path, wherein
one end of the first light shield in the direction parallel to the optical axis of the transmission optical path is disposed close to the rotating shaft, and the other end of the first light shield in the direction parallel to the optical axis of the transmission optical path is provided with a window adapted to transmit the laser beam.

13. The laser radar system according to claim 12, further comprising: a second light shield, disposed around the first receiving optical path and extending in a direction parallel to the optical axis of the receiving optical path, wherein one end of the second light shield in the direction parallel to the optical axis of the receiving optical path and the receiving lens group are disposed opposite, and the other end of the second light shield in the direction parallel to the optical axis of the receiving optical path is provided with a window adapted to receive the echo signal of the laser beam, wherein an optical channel is formed between the first light shield and the second light shield, and the optical channel is adapted for the echo signal of the laser beam to pass through.

14. The laser radar system according to claim 1, wherein the transmission module comprises:

a laser source, adapted to transmit the laser beam; and a transmission lens group, adapted to transmit or adjust the laser beam transmitted by the laser source, wherein a size of the transmission optical path in a direction perpendicular to an optical axis of the transmission optical path is determined by a size of the transmission lens group.

\* \* \* \* \*